United States Patent [19]

Grimaldi

[11] 4,090,718
[45] May 23, 1978

[54] BUTTON-SHAPED TOY RECORD PLAYER

[76] Inventor: Robert L. Grimaldi, 215 Lenox Ave., South Orange, N.J. 07079

[21] Appl. No.: 816,730

[22] Filed: Jul. 18, 1977

Related U.S. Application Data

[63] Continuation-in-part of Ser. No. 698,791, Jun. 6, 1976, abandoned.

[51] Int. Cl.² ............................................. G11B 3/00
[52] U.S. Cl. .................................................. 274/1 A
[58] Field of Search ................ 274/1 A, 1 R, 9 R, 14, 274/15 R

[56] References Cited

U.S. PATENT DOCUMENTS

| 1,979,067 | 10/1934 | Franklin | 274/1 A |
| 3,477,728 | 11/1969 | Lindsay et al. | 274/1 A |
| 3,709,505 | 1/1973 | Ashmele | 274/1 A |
| 3,817,536 | 6/1974 | Buck | 274/1 A |

Primary Examiner—Harry N. Haroian

[57] ABSTRACT

A toy record player in the shape of a lapel-attachable button includes a turntable hingeably attached to a housing and start-up means in the form of a rope for hingeably swinging the turntable from a first position in contact with the tone arm of the player to a second position out of contact therewith during operation of the start-up means.

1 Claim, 4 Drawing Figures

BUTTON-SHAPED TOY RECORD PLAYER

CROSS-REFERENCES TO RELATED APPLICATIONS

This application is a continuation-in-part of application Ser. No. 698,791 filed on June 6, 1976, now abandoned.

BACKGROUND OF THE INVENTION

1. Field of the Invention

The field of the present invention relates to a button-shaped toy record player.

2. Description of the Prior Art

A variety of toy record players are known, one of the most recent ones being a simple toy phonograph which enables a child to rotate a dial to select one of several sound tracks to be played. All of the known toy record players are relatively bulky and not suitable for being miniaturized to be disposed within a button generally worn on the lapel of a wearer.

SUMMARY OF THE INVENTION

It is accordingly one object of my invention to devise a toy record player which may be disposed within a button worn on the lapel of a wearer, or the like.

I accordingly provide a toy record player including a housing of synthetic plastic material, a turntable hingeably attached to the housing, a record which may be positioned on the turntable, drive means attached to the turntable for the rotation therof, a pick-up tone arm attached to the housing and in contact with the turntable positioned record for picking up mechanical vibrations from the rotating record, a loudspeaker attached to the housing and operatively connected to the tone arm for converting the vibrations into accoustical energy, and start-up means for activating the drive means and for hingeably swinging the turntable from a first position in contact with the tone arm to a second position out of contact therewith during operation of the start-up means.

The housing, preferably of synthetic plastic material, has the shape of a cylinder formed with an opening, and the drive means includes a windable torsion spring which is positioned substantially concentrically on the turntable in a wound state, and has a spring-holding drum disposed eccentrically with respect to the turntable for receiving the unwound spring. The start-up means includes a shaft which is concentrically attached to the turntable, a rope or the like passing through the opening in the housing, and wherein the rope is attached with one end thereof to the shaft; the rope winds up the spring upon being pulled outwards from the housing. The shaft has an inwardly pointing extremity; a leaf spring is attached to the housing and has first and second indentations for receiving the shaft extremity in the first and second positions of the turntable, respectively. A shaft-attachable spring holds the record on the shaft; and a tension spring is attached with one end therof to the housing and the other end thereof to the turntable for pulling the latter to the first position upon release of the pulled rope. The loudspeaker is disposed in the vicinity of one of the flat ends of the housing and a wearer-attachable pin is disposed externally on the other flat end of the housing.

BRIEF DESCRIPTION OF THE DRAWING

My invention will be better understood with reference to the accompanying drawing in which.

DESCRIPTION OF THE PREFERRED EMBODIMENT

Figure 4:
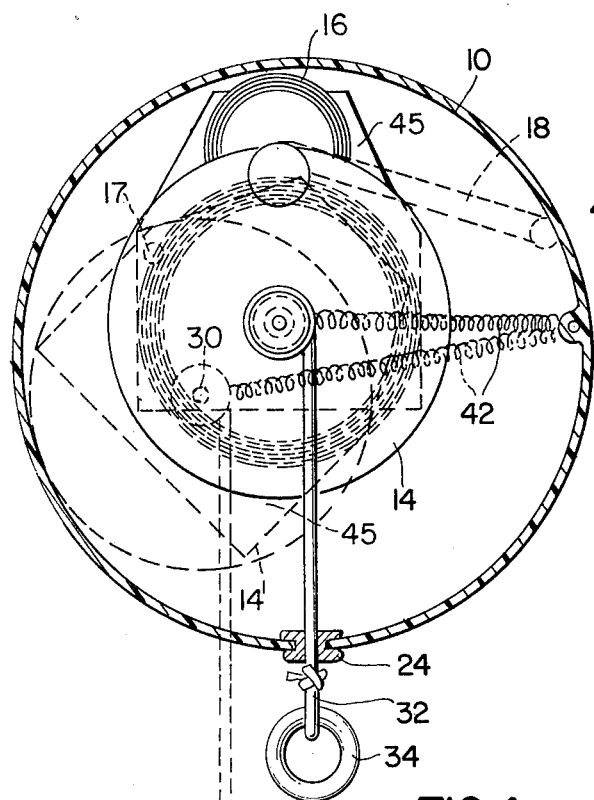
FIG. 4 shows a cross-section of FIG. 3 along the lines 4—4.
Figure 3:
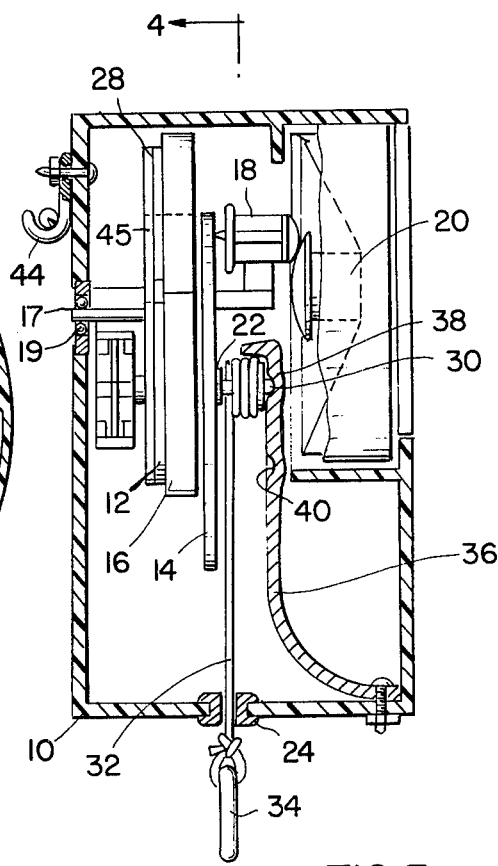
FIG. 3 shows a side-elevational view of the record player in cross-section.
Figure 2:
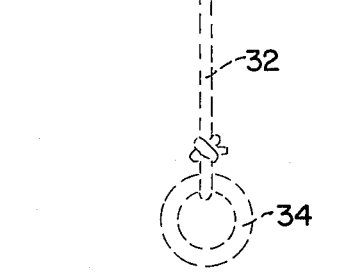
FIG. 2 shows the housing of the record player in elevation.
Figure 2:
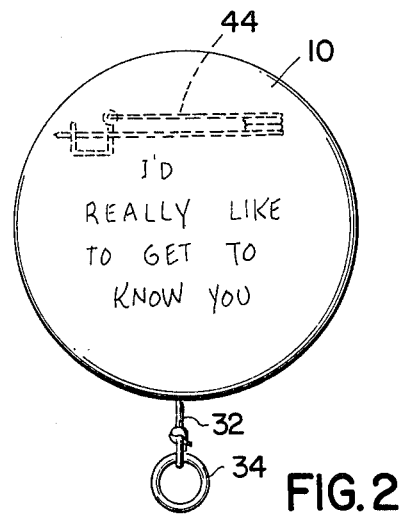
Figure 1:
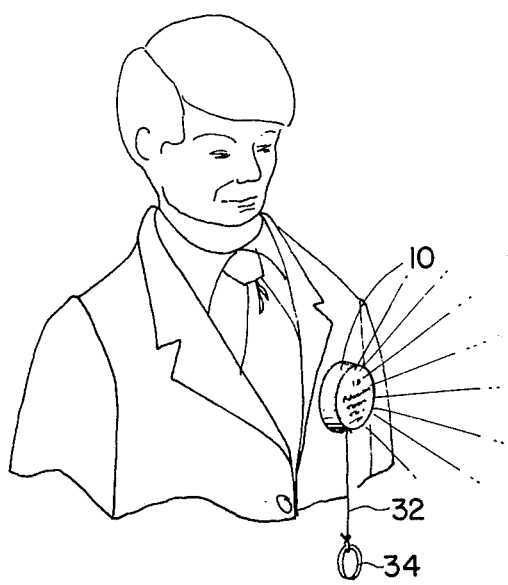
FIG. 1 shows the toy record-player disposed within a button attached to the suit of a wearer.

Referring now to the drawing, the toy record player according to my invention includes a housing 10, preferably made of synthetic plastic material and a turntable 12, hingeably attached to the housing 10; a record 14 may be positioned on the turntable 12, drive means 16 are attached to the turntable 12 through a common shaft 30 for the rotation thereof, and a pick-up tone arm 18 is attached to the housing 10 being in contact with the turntable-positioned record 14 for picking up mechanical vibrations from the rotating record 14. A loudspeaker 20 is attached to the housing 10 and is operatively connected to the tone arm 18 for converting the vibrations into accoustical energy, and start-up means in the form of a rope 32 for activating the drive means 16, and for hingeably swinging the turntable 12 and the record 14 around the longitudinal axis of a shaft 17 rotatable in a ball bearing 19, from a first position in contact with the tone arm 18 to a second position shown dotted in FIG. 4, out of contact therewith during the operation of the start-up means, permit the record player to play a message whenever the string is pulled and again released. The shaft 17 is connected to a plate 45 that supports the drum 28, the turntable 12, the spring 16, the shaft 30 and the record 14, if the latter is placed on the turntable 12 The housing 10 is preferably a cylinder formed with an opening 24, and the drive means includes a windable torsion spring 16 which is positioned substantially concentrically on the turntable 12 in a wound state; a spring-holding drum 28 is disposed eccentrically with respect to the turntable 12 for receiving the unwound spring 16. The start-up means includes the shaft 30 concentrically attached to the turntable 12, a rope 32 or the like passing through the opening 24 and attached with one end thereof to the shaft 30, and a grippable member 34 attached to the other end of the rope 32. The rope 32 then winds up the spring 16 upon being pulled outwardly from the housing 10, taking also along the drive means 12 and the record 14, thereby disengaging the latter from the tone arm 18, and occupying the position shown in dotted lines in FIG. 4. The shaft 30 has an inwardly pointing extremity and includes a leaf spring 36 attached to the housing 10, the leaf spring having a first indentation 38 and a second indentation 40 for receiving the shaft extremity in the first and second positions of the turntable 12, respectively. A shaft-attachable spring 22 holds the record normally on the shaft 30. A tension spring 42 is attached with one end thereof to the housing 10, and with its other end to the turntable 12 for pulling the latter to the first position upon release of the pulled rope 32. The housing 10 has first and second substantially flat ends, the loudspeaker 20 is disposed in the vicinity of one of the ends of the housing 10, and a wearer-attachable pin 44 is disposed externally on the other end of the housing 10.

Although the invention has been described with respect to a preferred version thereof, it is to be understood that it is not to be so limited since changes can be made therein which are within the full intended scope of the appended claims.

What is claimed is:

1. A toy record player comprising:
   a housing;
   a turntable having a shaft concentric therewith, said turntable being hingeably attached to said housing, a record being positionable on said turntable;
   drive means attached through said shaft to said turntable for the rotation thereof;
   a pick-up tone arm attached to said housing and in contact with the turntable-positioned record for picking up mechanical vibrations from the rotating record;
   a loudspeaker attached to said housing and operatively connected to said tone arm for converting said vibrations into accoustical energy;
   start-means for activating said drive means and for hingeably swinging said turntable in a radially outward direction from a first position in contact with said tone arm to a second position out of contact therewith during operation of said start-up means, said shaft being located in the second position of said turntable in a position parallel to the position of said shaft in the first position of said turntable, and wherein said housing is a synthetic plastic material in the shape of a cylinder formed with an opening, said drive means comprises a windable torsion spring positionable substantially concentrically on said turntable in a wound state and having a spring-holding drum disposed eccentrically with respect to said turntable for receiving the unwound spring, a rope or the like passing through said opening, said rope having two ends and attached with one end thereof to said shaft, and a grippable member attached to the other of said ends for said rope to wind up said spring upon being pulled outwards from said housing, and wherein said shaft has an inwardly pointing extremity;
   a leaf spring attached to said housing and having first and second indentations for receiving the shaft extremity in said first and second positions of said turntable, respectively;
   a shaft-attachable spring for holding the record on said shaft;
   a tension spring having two ends, and attached with one end thereof to said housing and with the other end thereof to said turntable for pulling the latter to said first position upon release of the pulled rope, and wherein said housing has first and second substantially flat ends, said loudspeaker being disposed in the vicinity of one of the ends thereof, and
   a wearer-attachable pin disposed externally on the other of the housing ends.

* * * * *